(12) United States Patent
Svilan et al.

(10) Patent No.: US 7,786,756 B1
(45) Date of Patent: Aug. 31, 2010

(54) METHOD AND SYSTEM FOR LATCHUP SUPPRESSION

(76) Inventors: Vjekoslav Svilan, 750 N. Shoreline Blvd., Apt. 58, Mountain View, CA (US) 94043; Tien-Min Chen, 1049 Jacqueline Way, San Jose, CA (US) 95129; Kleanthes G. Koniaris, 861 University Ave., #10, Palo Alto, CA (US) 94301; James B. Burr, 511 Broughton La., Foster City, CA (US) 94404

( * ) Notice: Subject to any disclaimer, the term of this patent is extended or adjusted under 35 U.S.C. 154(b) by 534 days.

(21) Appl. No.: 11/241,552

(22) Filed: Sep. 30, 2005

Related U.S. Application Data (63) Continuation-in-part of application No. 10/334,918, filed on Dec. 31, 2002, and a continuation-in-part of application No. 10/712,523, filed on Nov. 12, 2003, now Pat. No. 7,642,835, and a continuation-in-part of application No. 10/771,015, filed on Feb. 2, 2004, now Pat. No. 7,205,758, and a continuation-in-part of application No. 10/956,207, filed on Sep. 30, 2004, now Pat. No. 7,180,322.

(51) Int. Cl.
*H03K 17/16* (2006.01)
*H03K 19/003* (2006.01)
*H03K 3/00* (2006.01)

(52) U.S. Cl. ........................ 326/33; 327/108
(58) Field of Classification Search .......... 327/534–537
See application file for complete search history.

(56) References Cited

U.S. PATENT DOCUMENTS

| | | | |
|---|---|---|---|
| 4,798,974 A | 1/1989 | Reczek et al. | |
| 5,086,501 A | 2/1992 | DeLuca et al. | |
| 5,167,024 A | 11/1992 | Smith et al. | |
| 5,201,059 A | 4/1993 | Nguyen | |
| 5,204,863 A | 4/1993 | Saint-Joigny et al. | |
| 5,218,704 A | 6/1993 | Watts, Jr. et al. | |
| 5,230,055 A | 7/1993 | Katz et al. | |
| 5,239,652 A | 8/1993 | Seibert et al. | |

(Continued)

FOREIGN PATENT DOCUMENTS

EP 0381021 8/1990

(Continued)

OTHER PUBLICATIONS

"Wafer Burn-In Isolation Circuit", IBM Technical Disclosure Bulletin, IBM Corp., New York, US, vol. 32, No. 6B, Nov. 1, 1989, pp. 442-443, XP00073858 ISSN: 0018-8689 the whole document.
Baker K et al., "SHMOO Plotting: The Black Art of IC Testing", IEEE Design and Test of Computers, IEEE vol. 14, No. 3, Jul. 1, 1997, pp. 90-97, XP000793305 ISSN: 0740-7475 the whole document.

(Continued)

*Primary Examiner*—Rexford N Barnie
*Assistant Examiner*—Dylan White (57) ABSTRACT

Systems and methods of suppressing latchup. In accordance with a first embodiment of the present invention a latchup suppression system comprises a voltage comparator for comparing a voltage applied to a body terminal of a semiconductor device to a reference voltage. The voltage comparator is also for controlling a selective coupling mechanism. The selective coupling mechanism is for selectively coupling the body terminal to a respective power supply. The latchup suppressing system is preferably independent of a voltage supply for applying a voltage to the body terminal.

38 Claims, 5 Drawing Sheets

U.S. PATENT DOCUMENTS

| | | | |
|---|---|---|---|
| 5,386,135 | A | 1/1995 | Nakazato et al. |
| 5,422,591 | A | 6/1995 | Rastegar et al. |
| 5,422,806 | A | 6/1995 | Chen et al. |
| 5,440,520 | A | 8/1995 | Schutz et al. |
| 5,461,266 | A | 10/1995 | Koreeda et al. |
| 5,502,838 | A | 3/1996 | Kikinis |
| 5,511,203 | A | 4/1996 | Wisor et al. |
| 5,519,309 | A * | 5/1996 | Smith .................. 323/316 |
| 5,560,020 | A | 9/1996 | Nakatani et al. |
| 5,592,173 | A | 1/1997 | Lau et al. |
| 5,682,093 | A | 10/1997 | Kivela |
| 5,692,204 | A | 11/1997 | Rawson et al. |
| 5,717,319 | A | 2/1998 | Jokinen |
| 5,719,800 | A | 2/1998 | Mittal et al. |
| 5,727,208 | A | 3/1998 | Brown |
| 5,745,375 | A | 4/1998 | Reinhardt et al. |
| 5,752,011 | A | 5/1998 | Thomas et al. |
| 5,754,869 | A | 5/1998 | Holzhammer et al. |
| 5,757,171 | A | 5/1998 | Babcock |
| 5,778,237 | A | 7/1998 | Yamamoto et al. |
| 5,812,860 | A | 9/1998 | Horden et al. |
| 5,815,724 | A | 9/1998 | Mates |
| 5,825,674 | A | 10/1998 | Jackson |
| 5,848,281 | A | 12/1998 | Smalley et al. |
| 5,884,049 | A | 3/1999 | Atkinson |
| 5,894,577 | A | 4/1999 | MacDonald et al. |
| 5,923,545 | A | 7/1999 | Nguyen |
| 5,933,649 | A | 8/1999 | Lim et al. |
| 5,940,785 | A | 8/1999 | Georgiou et al. |
| 5,940,786 | A | 8/1999 | Steeby |
| 5,974,557 | A | 10/1999 | Thomas et al. |
| 5,996,083 | A | 11/1999 | Gupta et al. |
| 5,996,084 | A | 11/1999 | Watts |
| 6,035,407 | A | 3/2000 | Gebara et al. |
| 6,047,248 | A | 4/2000 | Georgiou et al. |
| 6,048,746 | A | 4/2000 | Burr |
| 6,078,319 | A | 6/2000 | Bril et al. |
| 6,087,892 | A | 7/2000 | Burr |
| 6,091,283 | A | 7/2000 | Murgula et al. |
| 6,118,306 | A | 9/2000 | Orton et al. |
| 6,119,241 | A | 9/2000 | Michail et al. |
| 6,157,092 | A | 12/2000 | Hofmann |
| 6,202,104 | B1 | 3/2001 | Ober |
| 6,216,235 | B1 | 4/2001 | Thomas et al. |
| 6,218,708 | B1 | 4/2001 | Burr |
| 6,272,642 | B2 | 8/2001 | Pole, III et al. |
| 6,279,048 | B1 | 8/2001 | Fadavi-Ardekani et al. |
| 6,304,824 | B1 | 10/2001 | Bausch et al. |
| 6,311,287 | B1 | 10/2001 | Dischler et al. |
| 6,314,522 | B1 | 11/2001 | Chu et al. |
| 6,345,363 | B1 | 2/2002 | Levy-Kendler |
| 6,347,379 | B1 | 2/2002 | Dai et al. |
| 6,378,081 | B1 | 4/2002 | Hammond |
| 6,388,432 | B2 | 5/2002 | Uchida |
| 6,415,388 | B1 | 7/2002 | Browning et al. |
| 6,425,086 | B1 | 7/2002 | Clark et al. |
| 6,427,211 | B2 | 7/2002 | Watts, Jr. |
| 6,442,746 | B1 | 8/2002 | James et al. |
| 6,457,135 | B1 | 9/2002 | Cooper |
| 6,466,077 | B1 * | 10/2002 | Miyazaki et al. ............ 327/534 |
| 6,477,654 | B1 | 11/2002 | Dean et al. |
| 6,487,668 | B2 | 11/2002 | Thomas et al. |
| 6,489,224 | B1 | 12/2002 | Burr |
| 6,510,400 | B1 | 1/2003 | Moriyama |
| 6,510,525 | B1 | 1/2003 | Nookala et al. |
| 6,513,124 | B1 | 1/2003 | Furuichi et al. |
| 6,519,706 | B1 | 2/2003 | Ogoro |
| 6,529,421 | B1 * | 3/2003 | Marr et al. ............ 365/189.09 |
| 6,574,739 | B1 | 6/2003 | Kung et al. |
| 6,600,346 | B1 * | 7/2003 | Macaluso .................. 327/108 |
| 6,784,722 | B2 * | 8/2004 | Tang et al. .................. 327/534 |
| 6,791,146 | B2 | 9/2004 | Lai et al. |
| 6,792,379 | B2 | 9/2004 | Ando |
| 6,803,633 | B2 | 10/2004 | Mergens et al. |
| 6,992,508 | B2 * | 1/2006 | Chow .................. 326/86 |
| 7,498,863 | B2 * | 3/2009 | Denais et al. ............... 327/427 |
| 2002/0026597 | A1 | 2/2002 | Dai et al. |
| 2002/0073348 | A1 | 6/2002 | Tani |
| 2002/0083356 | A1 | 6/2002 | Dai |
| 2002/0087896 | A1 | 7/2002 | Cline et al. |
| 2002/0113628 | A1 * | 8/2002 | Ajit .................. 327/108 |
| 2002/0116650 | A1 | 8/2002 | Halepete et al. |
| 2002/0138778 | A1 | 9/2002 | Cole et al. |
| 2002/0140494 | A1 * | 10/2002 | Thomas et al. ............. 327/530 |
| 2002/0194509 | A1 | 12/2002 | Plante et al. |
| 2003/0036876 | A1 | 2/2003 | Fuller et al. |
| 2003/0037008 | A1 | 2/2003 | Raju et al. |
| 2003/0065960 | A1 | 4/2003 | Rusu et al. |
| 2003/0074591 | A1 | 4/2003 | McClendon et al. |
| 2003/0149988 | A1 | 8/2003 | Ellis et al. |
| 2004/0025061 | A1 | 2/2004 | Lawrence |
| 2004/0073821 | A1 | 4/2004 | Naveh et al. |
| 2005/0160465 | A1 | 7/2005 | Walker |
| 2006/0125550 | A1 * | 6/2006 | Sumita et al. ............... 327/534 |
| 2006/0125551 | A1 * | 6/2006 | Sumita et al. ............... 327/534 |
| 2007/0024342 | A1 * | 2/2007 | Sumita et al. ............... 327/534 |

FOREIGN PATENT DOCUMENTS

| | | |
|---|---|---|
| EP | 0501655 | 2/1992 |
| EP | 0474963 | 3/1992 |
| JP | 409185589 | 7/1997 |
| WO | 0127728 | 4/2001 |

OTHER PUBLICATIONS

Desai et al., "Sizing of Clock Distribution Networks for High Performance CPU Chips", Digital Equipment Corporation, Hudson, MA, pp. 389-394, 1996.

Final OA Dated Mar. 8, 2007; U.S. Appl. No. 10/712,523.

Final OA Dated Jun. 8, 2006; U.S. Appl. No. 10/712,523.

Final OA Dated Jun. 29, 2007; U.S. Appl. No. 10/712,523.

Non Final OA Dated Jun. 3, 2005; U.S. Appl. No. 10/712,523.

Restriction Requirement Dated Nov. 22, 2005; U.S. Appl. No. 10/712,523.

Non Final OA Dated Jan. 23, 2008; U.S. Appl. No. 10/712,523.

Final OA Dated Aug. 21, 2008; U.S. Appl. No. 10/712,523.

Non Final OA Dated Jan. 30, 2009; U.S. Appl. No. 10/712,523.

Advisory Action Dated Sep. 25, 2007; U.S. Appl. No. 10/712,523.

Hsu, Jui-Ching, "Fabrication of Single Walled Carbon Nanotube (SW-CNT) Cantilevers for Chemical Sensing", M.Sc Thesis, Louisiana State University, Dec. 2007.

Merriam-Webster's Collegiate Dictionary, tenth edition, pp. 252 and 603 (Merriam-Webster Inc., Springfield, Mass, USA).

"Computer Software", Wikipedia, http://en.wikipedia.org/wiki.software, retrieved May 2, 2007.

"High Speed, Digitally Adjusted Stepdown Controllers for Notebook CPUS", Maxim Manual, pp. 11 & 21.

"Operation U ( Refer to Functional Diagram)". TLC 1736, Linear Technology Manual, p. 9.

Apple Computer, Inc., Apple QuickTime, various webpages, http://www.apple.com/quicktime/, accessed Jan. 10, 2006.

Apple Computer, Inc., QuickTime 7 Technology Brief, Nov. 2005.

Apple Computer, Inc., QuickTime 7 User's Guide, Nov. 16, 2005.

Apple Computer, Inc., QuickTime Guide for Windows, Jan. 10, 2006.

Movielink, LLC, Movielink Website, various webpages, http://www.movielink.com/, accessed Jan. 10, 2006.

Restriction Requirement Dated Feb. 28, 2005; U.S. Appl. No. 10/712,523.

Non-Final Office Action Dated Aug. 29, 2006; U.S. Appl. No. 10/712,523.

* cited by examiner

METHOD AND SYSTEM FOR LATCHUP SUPPRESSION

RELATED APPLICATIONS

This application is a continuation in part of co-pending, commonly owned U.S. patent application Ser. No. 10/334,918, filed Dec. 31, 2002, entitled "Adaptive Power Control" to Burr et al., which is hereby incorporated herein by reference in its entirety.

This application is a continuation in part of co-pending, commonly owned U.S. patent application Ser. No. 10/712,523, filed Nov. 12, 2003, now U.S. Pat. No. 7,642,835 entitled "System for Substrate Potential Regulation during Power-Up in Integrated Circuits" to Fu and Chen, which is hereby incorporated herein by reference in its entirety.

This application is a continuation in part of commonly-owned U.S. patent application Ser. No. 10/771,015, filed Feb. 2, 2004 now U.S. Pat. No. 7,205,758, entitled "Systems and Methods for Adjusting Threshold Voltage" to Masleid and Burr, which is hereby incorporated herein by reference in its entirety.

This application is a continuation in part of commonly-owned U.S. patent application Ser. No. 10/956,207 filed Sep. 30, 2004 now U.S. Pat. No. 7,180,322, entitled "Closed Loop Feedback Control of Integrated Circuits" to Koniaris and Burr, which is hereby incorporated herein by reference in its entirety.

FIELD OF THE INVENTION

Embodiments in accordance with the present invention relate to the application of body biasing voltage(s) to semiconductors. More specifically, embodiments in accordance with the present invention relate to latchup suppression.

BACKGROUND

In order to operate an integrated circuit, e.g., a microprocessor, in an efficient manner, for example, to consume a low amount of energy to accomplish a task, it is known to adjust various controlling parameters. These parameters may include threshold voltage of active devices of the integrated circuit. It is known to adjust threshold voltage after manufacture of an integrated circuit by adjusting body biasing voltage(s) applied to body biasing wells of such active devices.

SUMMARY OF THE INVENTION

Systems and methods of suppressing latchup associated with a semiconductor device, e.g., a microprocessor, are highly desired.

If a body biasing voltage supply is incapable of holding a body terminal at a desired body biasing voltage as Vdd and/or temperature increases, the body terminal will tend to drift toward a forward-biased condition.

Forward biasing a junction significantly increases the amount of source/drain leakage. If the junction becomes sufficiently forward-biased, the potential exists for a deleterious catastrophic failure such as latch-up.

In order to limit excessive forward biasing of active devices and to reduce the chances of latchup occurring in a situation where a body biasing voltage supply is unable to maintain a desirable body biasing voltage at a body biasing terminal, e.g., at a p-well for an NMOS device, a novel latchup suppression system is advantageously employed, in accordance with embodiments of the present invention.

Accordingly, systems and methods of suppressing latchup are disclosed. In accordance with a first embodiment of the present invention a latchup suppression system comprises a voltage comparator for comparing a voltage applied to a body terminal of a semiconductor device to a reference voltage. The voltage comparator is also for controlling a selective coupling mechanism. The selective coupling mechanism is for selectively coupling the body terminal to a respective power supply. The latchup suppressing system is preferably independent of a voltage supply for applying a voltage to the body terminal.

In accordance with an alternative embodiment of the present invention, a method of suppressing latchup in an integrated circuit comprises comparing a body biasing voltage of a body terminal to a desirable reference voltage and responsive to the comparing, selectively coupling the body terminal to a respective power supply.

In accordance with yet another embodiment of the present invention, a method of changing body bias of a semiconductor device comprises isolating a body terminal of the semiconductor device from its respective power supply and comparing a voltage of the body terminal to a reference voltage. The method further comprises selectively coupling the body terminal to a respective power supply responsive to the comparing.

In accordance with still another embodiment of the present invention, a latchup suppression system comprises a level shifting circuit for accessing a first control voltage to produce a second control voltage for controlling a plurality of selective coupling transistors.

DETAILED DESCRIPTION OF THE INVENTION

In the following detailed description of the present invention, method and system for latchup suppression, numerous specific details are set forth in order to provide a thorough understanding of the present invention. However, it will be recognized by one skilled in the art that the present invention may be practiced without these specific details or with equivalents thereof. In other instances, well-known methods, procedures, components, and circuits have not been described in detail as not to unnecessarily obscure aspects of the present invention.

Notation and Nomenclature

Some portions of the detailed descriptions that follow (e.g., processes 300 and 400) are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "accessing" or "commanding" or "comparing" or "storing" or "dividing" or "computing" or "testing" or "calculating" or "determining" or "storing'" or "measuring" or "adjusting" or "generating" or "performing" or "comparing" or "synchronizing" or "accessing'" or "retrieving'" or "conveying'" or "sending" or "resuming'" or "installing" or "gathering" or the like, refer to the action and processes of a computer system, or similar electronic computing device that manipulates and transforms data represented as physical (electronic) quantities within the computer system's registers and memories into other data similarly represented as physical quantities within the computer system memories or registers or other such information storage, transmission or display devices.

Method and System for Latchup Suppression

Embodiments in accordance with the present invention are described in the context of design and operation of integrated semiconductors. More particularly, embodiments of the present invention relate to latchup suppression. It is appreciated, however, that elements of the present invention may be utilized in other areas of semiconductor design and operation.

The following description of embodiments in accordance with the present invention is directed toward pFETs (or p-type Metal Oxide Semiconductor Field Effect Transistors (MOSFETS)) formed in surface N-wells and/or nFETs (or n-type MOSFETS) formed in surface P-wells when a p-type substrate and an N-well process are utilized. It is to be appreciated, however, that embodiments in accordance with the present invention are equally applicable to nFETs (e.g., n-type MOSFETS) formed in surface P-wells and/or pFETs (e.g., p-type MOSFETS) formed in surface N-wells when an n-type substrate and a P-well process are utilized. Embodiments in accordance with the present invention are well suited to a variety of types of semiconductors supporting electrically adjustable transistor threshold voltages and such embodiments are considered within the scope of the present invention. Examples of such semiconductors include a fully depleted body structure with back gate electrode separated from the body of a transistor by a buried insulator.

In this application the term "respective power supply" is used to refer to a power supply voltage, for example, operating voltage, e.g., Vdd, or ground, associated with a type of well. For example, an nFET may be formed in a P-well within a P-type substrate. Conventionally, this P-well is coupled to ground for non-body biased applications. Similarly, a pFET may be formed in an N-well within a P-type substrate. Conventionally, this N-well is coupled to operating voltage, e.g., Vdd, for non-body biased applications.

In the exemplary case of NMOS transistors constructed in p-wells, one or more body biasing voltage supplies, for example, internal to the integrated circuit, e.g., charge pumps, and/or external to the integrated circuit, can provide a body biasing voltage applied to the p-wells. Such body biasing voltages are generally utilized to adjust the threshold voltage of the NMOS devices, and correspondingly, to adjust other characteristics of the devices, e.g., "off" or leakage current. Frequently, although not necessarily, body biasing voltages are utilized to reverse bias a device, e.g., to increase threshold voltage or to decrease leakage current of the device.

In general, the body biasing voltage supplies provide some current as well, in order to compensate for leakage between the source and/or drain of the NMOS transistors and the P-well and/or a p-type substrate.

The amount of current required of a body biasing voltage supply generally increases as the operating supply voltage, e.g., Vdd, body biasing well voltage, and/or temperature of the integrated circuit are increased. If the body biasing voltage supplies are not strong enough, e.g., are not able to supply sufficient current, or if the impedance of a body biasing voltage path inhibits sufficiently rapid current flow adjustments, forward-biasing can potentially occur at the body/source and/or body/drain junctions of the transistor.

Further, a general trend of the semiconductor industry is to increase channel doping as process geometry continues to shrink. Such increases in channel doping tend to increase leakage of body biasing wells. This is yet another factor generally requiring increased currents of a body biasing voltage supply.

In an NMOS transistor, the device is generally considered forward-biased when the body bias voltage is greater than the source voltage.

For example, for a modern NMOS device, if the operating supply voltage (Vdd, connected to the drain) is at 1.0 volts, and the p-well body biasing terminal is at −0.4 volts, there is a 1.4 volt differential across the body-drain junction. If a body biasing voltage supply is incapable of holding the body p-wells at the desired body biasing voltage as Vdd and/or temperature increases, the p-well voltage will drift toward Vdd and the body/source junction may become forward-biased.

Forward biasing a junction significantly increases the amount of source/drain leakage. If the junction becomes sufficiently forward-biased, the potential exists for a deleterious catastrophic failure such as latch-up.

In order to limit excessive forward biasing of active devices and to reduce the chances of latchup occurring in a situation in which a body biasing voltage supply is unable to maintain a desirable body biasing voltage at a body biasing terminal, e.g., at a p-well for an NMOS device, a novel latchup suppression system is advantageously employed, in accordance with embodiments of the present invention.

Figure 1:
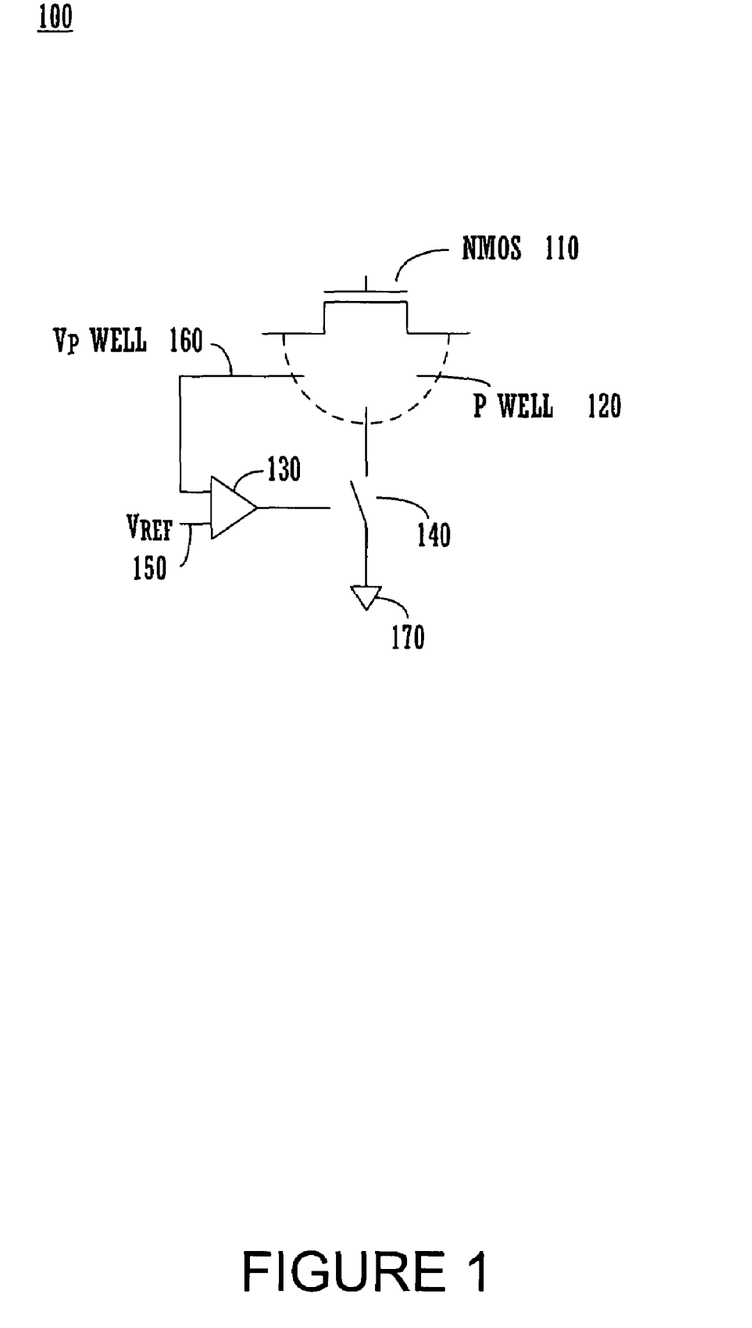
FIG. 1 illustrates a schematic of a novel latchup suppression system, in accordance with embodiments of the present invention.

FIG. 1 illustrates a schematic of a novel latchup suppression system 100, in accordance with embodiments of the present invention. N-type metal oxide semiconductor (NMOS) 110 is constructed in a p-well 120. A body biasing voltage Vp-well 160 may be applied to p-well 120 by a body biasing voltage source 121 and body biasing voltage distribution network 122.

A voltage comparator 130, for example a differential amplifier, compares Vp-well 160 to a reference voltage Vref 150. The output of voltage comparator 130 controls selective coupling circuit 140, for example, a semiconductor switch. Selective coupling circuit 140 can selectively couple p-well 120 to ground 170 or isolate p-well 120 from ground 170.

In accordance with an embodiment of the present invention, selective coupling circuit 140 couples p-well 120 to ground 170 in response to Vp-well 160 exceeding reference voltage Vref 150.

Reference voltage Vref 150 is determined, for example, to correspond to a safe level of body bias, e.g., a body bias that does not favor latchup conditions for NMOS 110. For example, for modern logic semiconductors, e.g., semiconductors characterized as having a critical dimension of 0.13 microns or less, exemplary values of Vref 150 for n-type metal oxide semiconductors formed in p-wells range from 0 volts to +175 mV.

Reference voltage Vref 150 can be generated in a variety of well known manners, for example via a resistor ladder network or via a voltage supply independent of a body biasing voltage supply. Embodiments in accordance with the present invention are well suited to fixed as well as adjustable voltage sources for reference voltage Vref 150.

It is to be appreciated that reference voltage Vref 150 typically drives a very high impedance source, e.g., voltage comparator 130. Consequently, reference voltage Vref 150 should be more stable than Vp-well 160. For example, loading characteristics that may deleteriously affect regulation of Vp-well 160 should not have a similar effect upon Vref 150.

During operation of circuitry comprising NMOS 110, a body biasing voltage Vp-well 160 can be applied to p-well 120. For example, a body biasing voltage can be applied to increase a threshold voltage of NMOS 110.

As described previously, a variety of influences can cause Vp-well 160 to deviate from its desired value. For example, increasing leakage current due, e.g., to increasing operating voltage and/or increasing temperature, can exceed current sourcing capabilities of a body biasing voltage source.

In accordance with embodiments of the present invention, if Vp-well 160 rises above Vref 150, selective coupling circuit 140 becomes conductive and will force Vp-well 160 toward its respective supply, in this case ground 170.

It is to be appreciated that latchup suppression system 100 functions independently of a voltage supply, e.g., a body biasing voltage supply. For example, if Vp-well 160 of p-well 120 rises above a desirable level, p-well 120 should be coupled to ground. However, the body biasing voltage supply attempting to provide a body biasing voltage to p-well 120 is not necessarily shut down, e.g., turned off, by this action.

Due to a variety of factors, including, e.g., impedances in a body biasing voltage distribution network and/or segmentation, e.g., one body biasing supply coupled to a plurality of independent body biasing domains, the body biasing voltage supply can continue to operate and supply body biasing voltage to other devices.

It is to be further appreciated that, due to a variety of factors including design and manufacturing process variation, different semiconductor devices, even on the same substrate, can consume varying amounts of leakage current, even when such devices are nominally at the same body biasing voltage. Hence, for example, one device, e.g., NMOS 110, could require a very high amount of current to overcome its leakage and sustain a desirable body biasing voltage condition. Other devices coupled to the same body biasing voltage supply, may require less current to sustain their body biasing voltage.

Consequently, it can be beneficial to limit the effect of a latchup suppression action, e.g., coupling p-well 120 to ground, such that a latchup suppression action does not affect all devices coupled to a body biasing voltage supply. Embodiments in accordance with the present invention are characterized as having this desirable attribute.

Selective coupling circuit 140 is well suited to a variety of well known circuits that act substantially as switches. For example, selective coupling circuit 140 is well suited to use of a transistor device, e.g., an NMOS device. In order to use a transistor device for selective coupling circuit 140, such a transistor should be capable of achieving both very low resistance, e.g., on or conducting, and very high resistance, e.g., off or non-conducting, conditions when coupled to p-well 120 and ground 170.

For example, when p-well 120 has a desirable body biasing voltage applied, a transistor-based selective coupling circuit 140 should be substantially non-conducting.

It is to be appreciated that similar structures and methods related to body biasing of pMOS devices constructed in N-type wells, and coupling such wells to a respective power supply, e.g., an operating voltage, are complementary to the above-described embodiment, and are to be considered within the scope of the present invention.

Figure 2A:
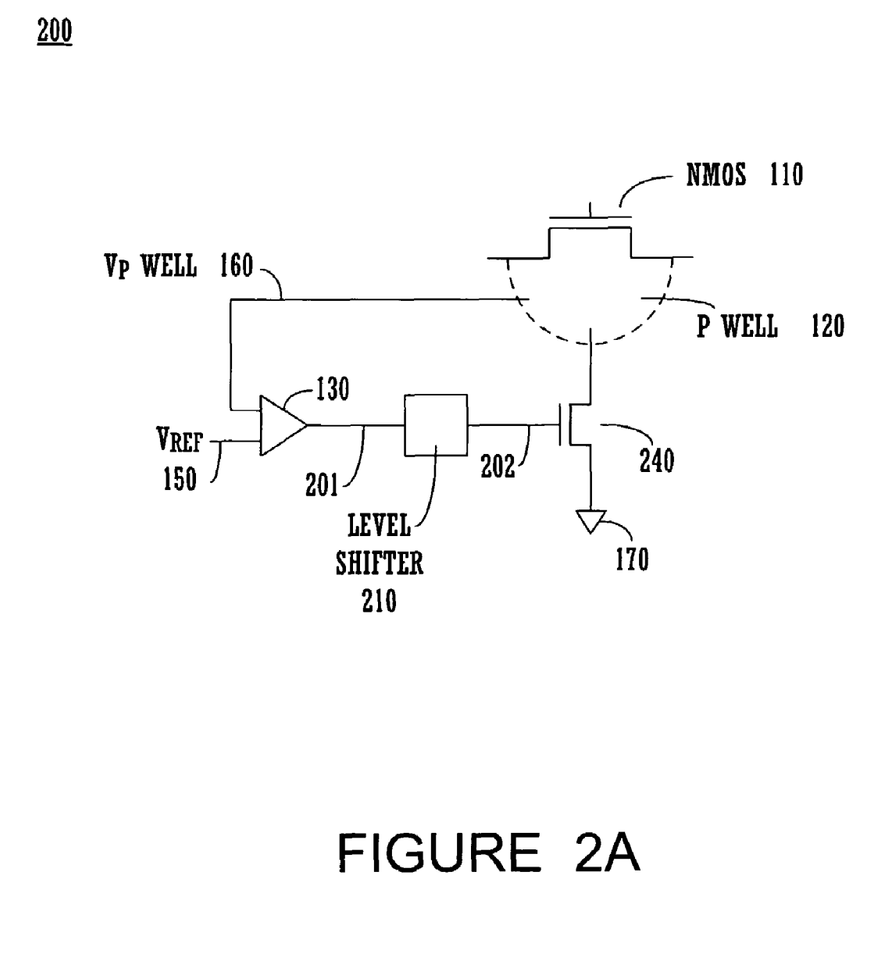
FIG. 2A illustrates a schematic of a novel latchup suppression system, in accordance with embodiments of the present invention.

FIG. 2A illustrates a schematic of a novel latchup suppression system 200, in accordance with embodiments of the present invention. Latchup suppression system 200 corresponds generally to latchup suppression system 100 (FIG. 1). Latchup suppression system 200 comprises a plurality of n-type selective coupling transistor(s) 240, implementing selective coupling circuit 140 of FIG. 1.

In a situation in which NMOS 110 is reverse biased, the Vp-well 160 voltage is less than zero volts. In this case the output 201 of voltage comparator 130 is desired to be low so as to cause selective coupling transistor 240 to isolate p-well 120 from ground.

However, under these conditions, the p-well 120 is at a negative potential. Consequently, p-well 120 acts as a source terminal for selective coupling transistor(s) 240. Thus, even though the gate of selective coupling transistor 240 is at zero volts, and selective coupling transistor 240 is desired to be in an "off" or non-conducting state, the selective coupling transistor 240 is actually in an "on" condition if Vp-well 160 is less than −0.5V (assuming an exemplary transistor threshold voltage of 0.5 volts for selective coupling transistor 240). In this case current begins flowing through selective coupling transistor 240. Deleteriously, current flows in the wrong direction, e.g., "up" from ground 170. Such current flowing into the p-well 120 can have numerous detrimental effects.

In accordance with an embodiment of the present invention, a level shifter is inserted between the output of the voltage comparator and gates of the plurality of selective coupling transistor(s) 240.

Figure 2B:
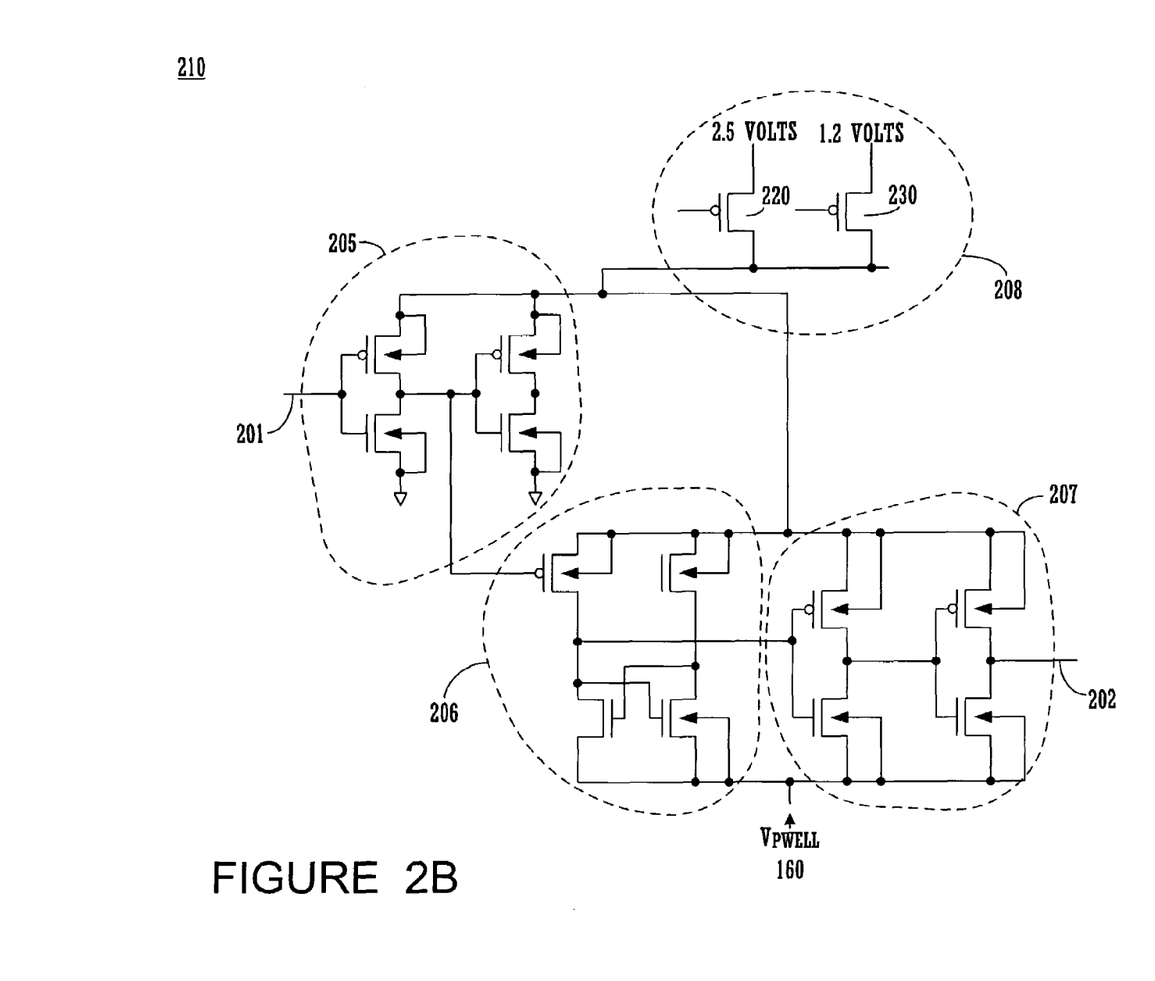
FIG. 2B illustrates a schematic of an exemplary level shifting circuit, in accordance with embodiments of the present invention.

FIG. 2B illustrates a schematic of an exemplary level shifting circuit 210, in accordance with embodiments of the present invention. Level shifting circuit 210 comprises a dual inverter input stage 205, a cross-coupled level shifting stage, a dual inverter output stage 207 and an optional selectable supply voltage circuit 208.

Level shifting circuit 210 changes the lower level output 201 of voltage comparator 130 to be Vp-well 160. Consequently, when an output of voltage comparator 130 indicates that selective coupling transistor 240 should be in an off or non-conducting condition, output 202 of level shifting circuit 210, coupled to the gate(s) of the plurality of selective coupling transistor 240, is Vp-well 160. As a beneficial result, selective coupling transistor 240 is fully off, and deleterious currents do not flow onto p-well 120.

Optional selectable supply voltage circuit 208 enables level shifting circuit 210 to selectively operate from either 1.2 volts or 2.5 volts. Operation of level shifting circuit 210 from 1.2 volts protects the devices comprising level shifting circuit 210, as well as the coupling devices, from over-stress in a situation in which Vp-well 160 is negative. For example, if level shifting circuit 210 were operating from a 2.5 volt supply and Vp-well 160 was −1 volt, a total of 3.5 volts would be placed across devices, overstressing such devices, potentially leading to device failure.

However, operation from 1.2 volts may be disadvantageous in certain situations. For example, in a case in which body biasing wells are being coupled to respective power supplies, the gate voltages of such coupling devices are at only 1.2 volts, significantly reducing their drive strength. For such situations, operation from a higher voltage, e.g., 2.5 volts, is desirable.

Advantageously, when body biasing wells are being coupled to respective power supplies, Vp-well 160 is at ground potential or higher. In such a case, driving the level shifting circuit 210 from 2.5 volts will not result in an overstressing condition, as the total voltage across the devices is 2.5 volts or less.

Similarly, when body biasing wells are isolated from their respective power supplies, Vp-well 160 may be at less than ground potential, and the total voltage across the devices could be more than 2.5 volts. Consequently, in this situation, the devices comprising the level shifting circuit 210 should be operated from 1.2 volts. Beneficially, the coupling devices are disabled, and do not require a higher drive voltage.

It is appreciated that devices 220 and 230 should be controlled in a logical XOR fashion, i.e. only one should be selected at a time.

Figure 3:
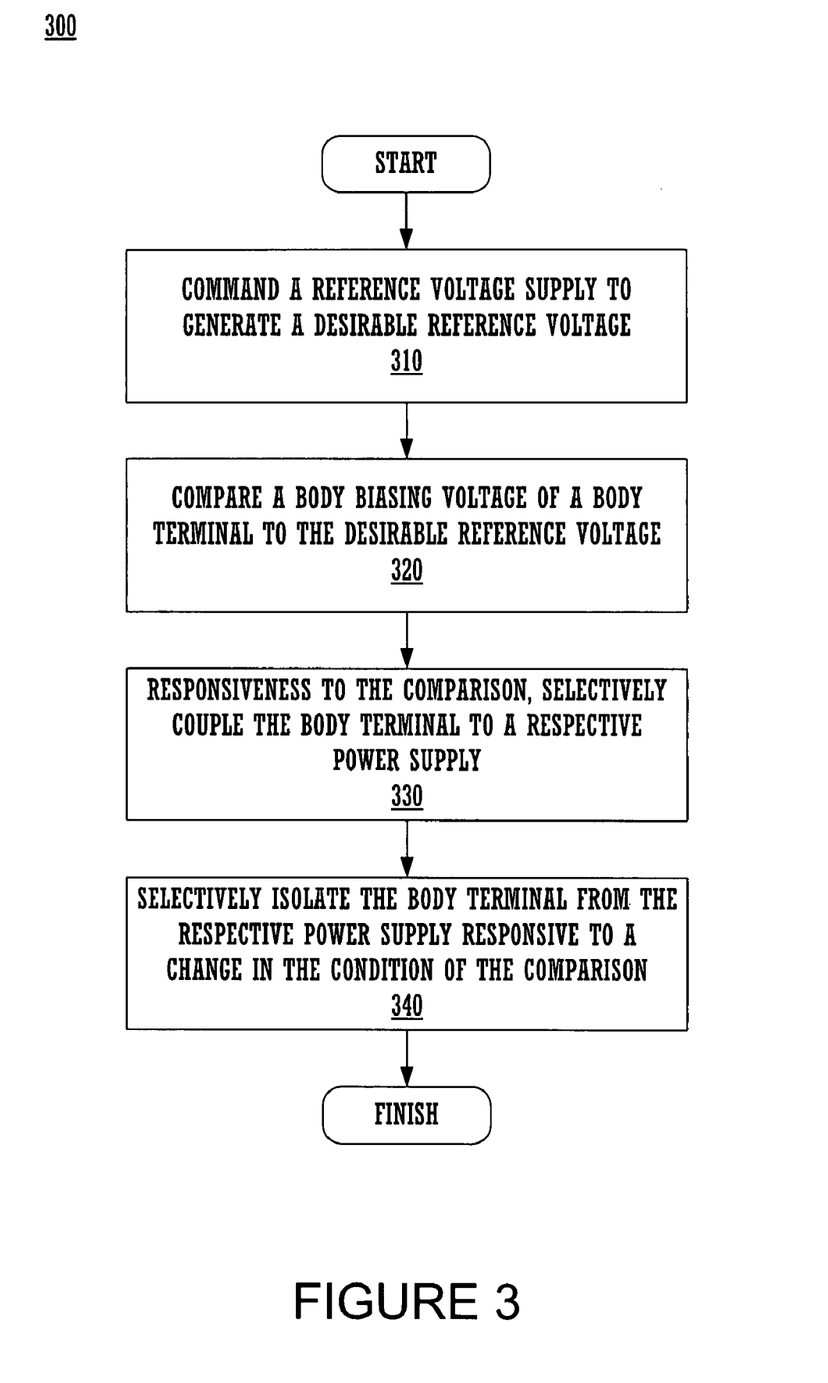
FIG. 3 illustrates an exemplary method of suppressing latchup, in accordance with embodiments of the present invention.

FIG. 3 illustrates an exemplary method 300 of suppressing latchup, in accordance with embodiments of the present invention. It is to be appreciated that method 300 is well suited to implementation via computer, e.g., executing a series of stored processor instructions, as well as implementation via electronic circuitry generally referred to as "hardware," as well as a combination of the two.

In optional 310, a reference voltage supply is commanded to generate a desirable reference voltage, e.g., reference voltage Vref 150 of FIG. 1. Such a command is well suited to fixed command means, e.g., substantially permanent values, for example a fixed voltage supply, as well as changeable values, e.g., supplied under computer control.

In 320, a body biasing voltage of a body terminal, e.g., Vp-well 160 of FIG. 1, is compared to the desirable reference voltage. Such comparison is well suited to hardware implementations, e.g., as described with respect to FIG. 1, as well as to software-based implementations. For example, a processor can access a digital representation of a body biasing voltage and perform such comparison via program steps.

In 330, the body terminal is selectively coupled to a respective power supply responsive to the comparison.

For example, for n-type devices formed in p-type wells, e.g., NMOS 110 of FIG. 1, an exemplary limit of body biasing voltage can be +125 mV. For example, at body biasing voltages above this value, there is a risk of deleterious effects, including thermal runaway or latchup. Consequently, a desirable reference voltage can be set to this upper limit value. If the voltage of the body terminal exceeds the desirable reference voltage, the body terminal is coupled to ground, greatly reducing an opportunity for latchup.

Similarly, for p-type devices formed in n-type wells, an exemplary limit of body biasing voltage can be 125 mV below its respective supply, e.g., Vdd. For example, at body'biasing voltages less than this value, there is a risk of deleterious effects, including thermal runaway or latchup. Consequently, a desirable reference voltage can be set to this limit value. If the voltage of the body terminal decreases below the desirable reference voltage, the body terminal is coupled to Vdd or other respective supply, greatly reducing an opportunity for latchup.

It is to be appreciated that embodiments in accordance with the present invention are well suited to utilizing adjustable reference voltages. For example, "safe" limits for body biasing voltages, e.g., body biasing voltages that do not encourage latchup, can vary according to other operating conditions of a semiconductor. For example, operating voltage, e.g., Vdd, and operating temperature strongly influence latchup characteristics. Consequently, for example, reference voltage(s) can be beneficially adjusted to reflect changes in semiconductor operating conditions.

In optional 340, the body terminal is selectively isolated from the respective power supply responsive to a change in the condition of the comparison. For example, if the body terminal was grounded responsive to the body terminal voltage exceeding the reference voltage, then if the reference voltage exceeds the body terminal voltage, the body terminal is isolated.

It is to be appreciated that if a body biasing well is allowed to float, e.g., is not strongly coupled to the source and/or substrate, such a well voltage floats to balance point between a forward bias of a p-n junction formed between the source and the body and a reverse bias p-n junction formed between the drain and the body. Reverse bias junction leakage of a drain to well will tend to raise the voltage of the well and forward bias the device.

This passive characteristic mechanism of the transistor tends to forward bias the device. This tendency is generally considered deleterious under the convention art, as such forward biasing can lead to deleterious conditions, for example, an increase in leakage current or latchup. In accordance with embodiments of the present invention, however, this characteristic can be controlled in order to provide a beneficial mechanism of applying a beneficially desirable forward bias while avoiding latchup.

Figure 4:
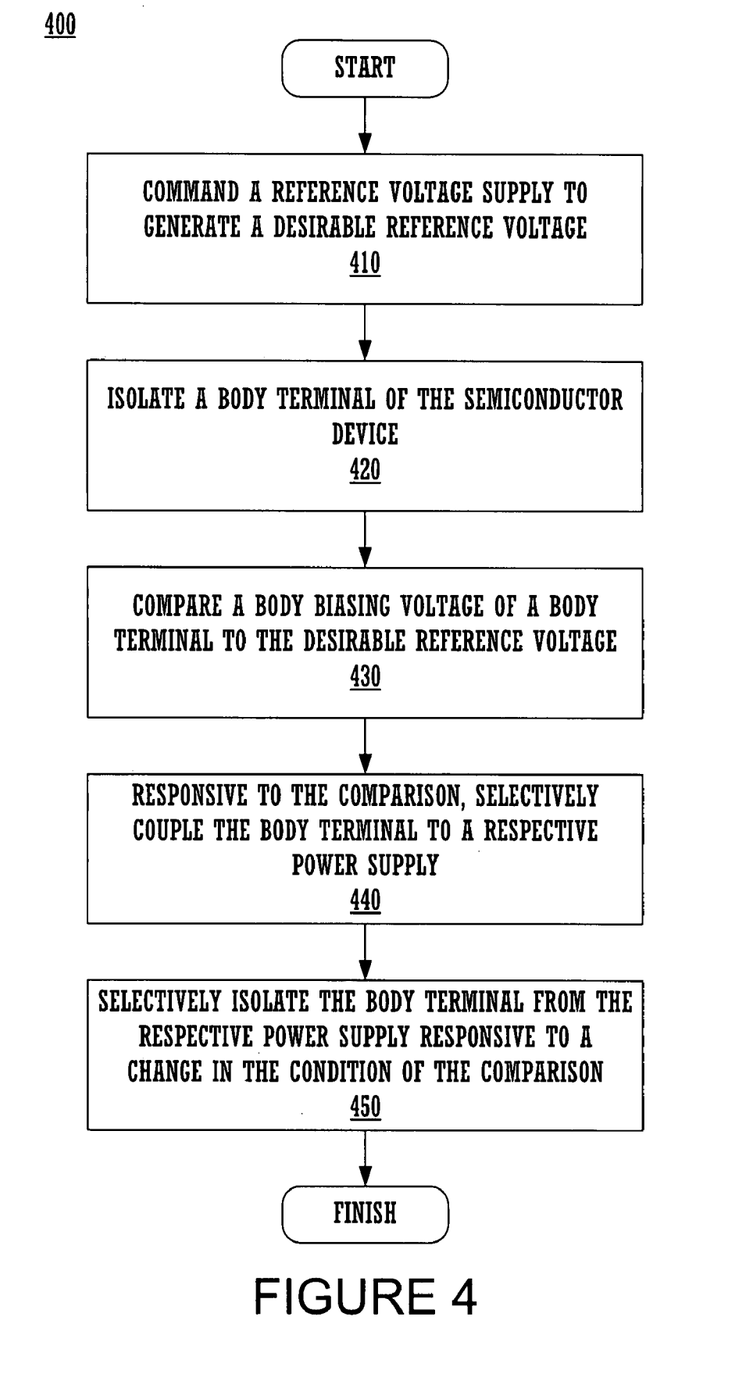
FIG. 4 illustrates an exemplary method of changing body bias of a semiconductor device, in accordance with embodiments of the present invention.

FIG. 4 illustrates an exemplary method 400 of changing body bias of a semiconductor device, in accordance with embodiments of the present invention. In optional 410, a reference voltage supply is commanded to generate a desirable reference voltage, e.g., reference voltage Vref 150 of FIG. 1. Such a command is well suited to fixed command means, e.g., substantially permanent values, for example a fixed voltage supply, as well as changeable values, e.g., supplied under computer control.

In 420, a body terminal, e.g., Vp-well 160 of FIG. 1, of the semiconductor device is isolated. For example, the body terminal is isolated from a body biasing voltage source as well as from a ground or operating voltage reference. In general, such isolation of a body terminal will tend to forward bias the semiconductor device.

In 430, a voltage of the body terminal, e.g., Vp-well 160 of FIG. 1, is compared to the desirable reference voltage. Such comparison is well suited to hardware implementations, e.g., as described with respect to FIG. 1, as well as to software-based implementations. For example, a processor can access a digital representation of a body biasing voltage and perform such comparison via program steps.

In 440, the body terminal is coupled to a respective power supply responsive to the comparison.

In general, teachings of the conventional art teach away from an uncoupled body terminal. For example, many design rules checking (DRC) procedures require a minimum level of connectivity to body terminals. In contrast, in accordance with embodiments of the present invention, the natural tendency of an uncoupled body terminal to forward bias a semiconductor device can be advantageously utilized while minimizing opportunities for deleterious effects, such as latchup.

In optional 450, the body terminal is selectively isolated from the respective power supply responsive to a change in the condition of the comparison. For example, if the body terminal was grounded responsive to the body terminal voltage exceeding the reference voltage, then if the reference voltage exceeds the body terminal voltage, the body terminal is isolated.

In this novel manner, a sequence of coupling and isolating an otherwise floating body terminal can advantageously maintain a forward bias condition without utilizing a body bias voltage supply.

Embodiments in accordance with the present invention thus provide systems and methods of suppressing latchup.

Embodiments in accordance with the present invention, method and system for latchup suppression, are thus described. While the present invention has been described in particular embodiments, it should be appreciated that the present invention should not be construed as limited by such embodiments, but rather construed according to the below claims.

What is claimed is:

1. A latchup suppression system comprising:
    a voltage supply configured for applying a voltage to a body terminal of a semiconductor device;
    a selective coupling mechanism configured to selectively isolate the body terminal from the voltage-supply responsive to a reference voltage exceeding the voltage at the body terminal; and
    a voltage comparator configured to compare the voltage at body terminal to the reference voltage, and configured to control the selective coupling mechanism.

2. The latchup suppression system of claim 1, wherein the voltage comparator and the selective coupling mechanism are configured to be controlled independently of the voltage supply.

3. The latchup suppression system of claim 2 wherein the selective coupling mechanism is configured to couples the body terminal to the voltage supply responsive to the body terminal voltage exceeding the reference voltage.

4. The latchup suppression system of claim 1 wherein the selective coupling is configured to not interrupt operation of the voltage supply.

5. The latchup suppression system of claim 1 embedded in an integrated circuit.

6. The latchup suppression system of claim 5 wherein the integrated circuit comprises a microprocessor.

7. A latchup suppression system comprising:
    a voltage comparator for generating a first control voltage responsive to a relationship of a voltage applied to a body terminal of a semiconductor device and a reference voltage;
    a plurality of selective coupling transistors for selectively coupling said body terminal to a respective power supply; and
    a level shifting circuit for accessing said first control voltage to produce a second control voltage for controlling said plurality of selective coupling transistors.

8. The latchup suppression system of claim 7 wherein the voltage comparator, the plurality of selective coupling transistors and the level shifting circuit are configured to be controlled independently of a voltage supply configured to apply a voltage to the body terminal.

9. The latchup suppression system of claim 8 wherein said plurality of selective coupling transistors couples said body terminal to said respective power supply responsive to said body terminal voltage exceeding said reference voltage.

10. The latchup suppression system of claim 8 wherein said plurality of selective coupling transistors isolates said body terminal from said respective power supply responsive to said reference voltage exceeding said body terminal voltage.

11. The latchup suppression system of claim 7 wherein said second control voltage is for turning said plurality of selective coupling transistors substantially fully off when said body terminal is at less than a ground potential.

12. The latchup suppression system of claim 7 wherein a lower voltage rail of said level shifting circuit is coupled to said body terminal.

13. The latchup suppression system of claim 7 wherein said level shifting circuit is selectively coupled to one of at least two operating voltages.

14. A method of suppressing latchup in an integrated circuit comprising: comparing a body biasing voltage of a body terminal to a desirable reference voltage; and responsive to said comparing, selectively isolating said body terminal from a respective power supply.

15. The method of claim 14 wherein said body terminal is coupled to a p-type well of said integrated circuit.

16. The method of claim 15 wherein said coupling is responsive to said reference voltage exceeding said body biasing voltage.

17. The method of claim 14 wherein said body terminal is coupled to an n-type well of said integrated circuit.

18. The method of claim 17 wherein said coupling is responsive to said body biasing voltage dropping below said reference voltage.

19. The method of claim 14 further comprising commanding a reference voltage supply to generate said desirable reference voltage.

20. The method of claim 14 further comprising isolating said body terminal from said respective power supply responsive to a change in a condition of said comparing.

21. A method of changing body bias of a semiconductor device comprising:
    isolating a body terminal of the semiconductor device;
    comparing a voltage of the body terminal to a reference voltage; and
    responsive to said comparing, selectively coupling the body terminal to a respective power supply.

22. The method of claim 21 wherein the body terminal is coupled to a p-type well of said semiconductor device.

23. The method of claim 22 wherein said coupling is responsive to the reference voltage exceeding the body biasing voltage.

24. The method of claim 21 wherein the body terminal is coupled to an n-type well of the semiconductor device.

25. The method of claim 24 wherein said coupling is responsive to the body biasing voltage dropping below the reference voltage.

26. The method of claim 21 further comprising commanding a reference voltage supply to generate the reference voltage.

27. The method of claim 21 wherein the reference voltage corresponds to a forward bias condition of the semiconductor device.

28. A latchup suppression system comprising:
a voltage supply means configured to apply a voltage to a body terminal of a metal oxide semiconductor field effect transistor (MOSFET);
a selective coupling means configured to selectively couple the body terminal to a respective power supply means responsive to the body terminal voltage exceeding a reference voltage; and
a voltage comparator means configured to compare the voltage applied to the body terminal of the MOSFET to the reference voltage, and configured to control the selective coupling means and wherein the voltage comparator means and the selective coupling means are configured to be controlled independently of the voltage supply configured for applying a voltage to the body terminal of the MOSFET.

29. The latchup suppression system of claim 28 wherein the selective coupling means is configured to isolate the body terminal of the MOSFET from the respective power supply means responsive to the reference voltage exceeding the body terminal voltage.

30. The latchup suppression system of claim 28 wherein the selective coupling means is configured to not interrupt operation of the voltage supply means for applying a voltage to the body terminal.

31. The latchup suppression system of claim 28 embedded in an integrated circuit.

32. The latchup suppression system of claim 31 wherein the integrated circuit comprises a microprocessor.

33. A latchup suppression system comprising:
a voltage comparator means for generating a first control voltage responsive to a relationship of a voltage applied to a body terminal of a semiconductor device and a reference voltage;
a plurality of selective coupling transistor means for selectively coupling the body terminal to a respective power supply means; and
a level shifting circuit means coupled to receive the first control voltage and for producing a second control voltage for controlling the plurality of selective coupling transistor means.

34. The latchup suppression system of claim 33 wherein the voltage comparator means, the plurality of selective coupling transistor means and the level shifting circuit means are configured to be controlled independently of a voltage supply means configured to apply a voltage to the body terminal.

35. The latchup suppression system of claim 34 wherein the plurality of selective coupling transistor means couples the body terminal to the respective power supply means responsive to the body terminal voltage exceeding the reference voltage.

36. The latchup suppression system of claim 34 wherein the plurality of selective coupling transistor means isolates the body terminal the respective power supply means responsive to the body terminal voltage exceeding the reference voltage.

37. The latchup suppression system of claim 33 wherein the second control voltage is for turning the plurality of selective coupling transistor means substantially fully off when the body terminal is at less than ground potential.

38. The latchup suppression system of claim 33 wherein a lower voltage rail of said level shifting circuit means is coupled to the body terminal.

* * * * *